__United States Patent Office__

3,461,129
Patented Aug. 12, 1969

3,461,129
4-ALKOXY (AND 4-CYCLOALKOXY) -3-OXAZO-LINES HAVING HALOGENATED HYDROCARBON SUBSTITUENTS IN THE 2- AND 5-POSITIONS
William J. Middleton, Wilmington, Del., assignor to E. I. du Pont de Nemours and Company, Wilmington, Del., a corporation of Delaware
No Drawing. Continuation-in-part of application Ser. No. 435,734, Feb. 26, 1965, which is a division of application June 8, 1966, Ser. No. 555,974. This application May 4, 1967, Ser. No. 636,019
Int. Cl. C07d 85/36
U.S. Cl. 260—307       5 Claims

ABSTRACT OF THE DISCLOSURE

Claimed are 4-alkoxy (or -cycloalkoxy) -3-oxazolines having selected halogenated hydrocarbon substituents in the 2- and 5-positions, e.g., 4-methoxy-2,2,5,5-tetrakis (trifluoromethyl)-3-oxazoline. They are useful as solvents for highly fluorinated polymers to yield solutions suitable for rendering paper and fabrics oil- and water-repellant.

RELATED APPLICATIONS

This application is a division and continuation-in-part of my coassigned, copending application, Ser. No. 555,974, now abandoned but filed June 8, 1966, as a continuation-in-part of my coassigned application Ser. No. 435,734, filed Feb. 26, 1965, now U.S. Patent 3,310,570.

FIELD OF THE INVENTION

This invention relates to, and has as its principal object provision of, novel 4-alkoxy (or -cycloalkoxy) -3-oxazolines having selected halogenated hydrocarbon substituents in the 2- and 5-positions.

DETAILS OF THE INVENTION

The novel compounds of this invention are 4-alkoxy (or -cycloalkoxy) -3-oxazolines of the formula

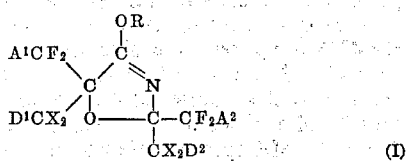

(I)

wherein R is alkyl or cycloalkyl of up to 10 carbon atoms; $A^1$ and $A^2$, which can be alike or different, are hydrogen, fluorine, chlorine, bromine, or, in combination with $D^1$ and $D^2$, respectively, are perfluoroalkylene of 1–2 carbon atoms; $D^1$ and $D^2$, which can be alike or different, are hydrogen, fluorine, chlorine, bromine, or, in combination with $A^1$ and $A^2$, respectively are perfluoroalkylene of 1–2 carbon atoms; and the X's, which can be alike or different, are fluorine, chlorine, or bromine, with the proviso that no more than one bromine is attached to the same carbon.

These compounds are prepared by alkylation or cycloalkylation of 4-oxazolidones of the formula

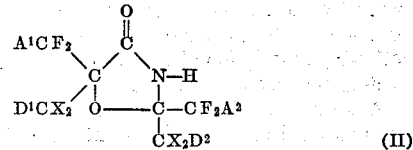

(II)

wherein $A^1$, $A^2$, $D^1$, $D^2$, and X have the meanings defined above, or their alkali metal salts, with alkylating or cycloalkylating agents such as alkyl and cycloalkyl halides, alkyl and cycloalkyl sulfates or diazoalkanes.

The reaction with sulfates can be carried out by adding an excess, e.g., a 50–100% excess, of a dialkyl or a dicycloalkyl sulfate to a solution of the 4-oxazolidone having halogenated hydrocarbon substituents in the 2- and 5-positions or, preferably, an alkali metal salt thereof, in an inert solvent, e.g., acetonitrile, and the mixture maintained at a reaction temperature of 0–100° C. for several hours, e.g., 10–24 hours. At the end of this reaction period, water is added to dissolve the precipitated salt. The organic layer is separated, dried, and distilled to give the desired 4-alkoxy- or 4-cycloalkoxy-3-oxazoline having halogenated hydrocarbon substituents in the 2- and 5-positions.

The alkylation of the 4-oxazolidones with diazoalkanes is carried out by adding a solution of a diazoalkane, e.g., diazomethane, in an inert solvent such as an ether, gradually to a solution of a halogenated hydrocarbon substituted 4-oxazolidone of Formula II in an ether at −80 to 35° C. Addition of the diazoalkane solution is continued until a faint yellow color persists in the reaction mixture, about one molecular equivalent of the diazoalkane being required. The reaction mixture is then distilled to isolate the 4-alkoxy-3-oxazoline having halogenated hydrocarbon substituents in the 2- and 5-positions.

The reaction with an alkyl or cycloalkyl halide as alkylating agent is carried out by adding a molecular equivalent of an alkyl or cycloalkyl halide, i.e., chloride, bromide, or iodide, to a solution of a salt of a 4-oxazolidone of Formula II with a Group I metal in an inert solvent, e.g., acetonitrile, at a temperature of 0–150° C. The Group I metal halide which forms precipitates from the reaction mixture. After removal of the precipitated metal halide by filtration, distillation of the filtrate yields the 4-alkoxy (or 4-cycloalkoxy) -3-oxazoline having halogenated hydrocarbon substituents in the 2- and 5-positions.

3-alkyl (or 3-cycloalkyl) -4-oxazolidones having halogenated hydrocarbon substituents in the 2- and 5-positions are also formed along with the 4-alkoxy (or 4-cycloalkoxy) -3-oxazolines in these alkylation reactions (cf., my above-mentioned U.S. Patent 3,310,570).

The 4-oxazolidones of Formula II can be prepared by reaction of at least two molecular equivalents of a fluoroketone of the formula

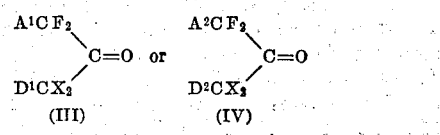

(III)   (IV)

wherein $A^1$, $D^1$, $A^2$, $D^2$, and X have the meanings given hereinbefore, with one molecular equivalent of an alkali metal or quaternary ammonium cyanide by the method described in U.S. Patent 3,310,570, for the reaction of hexafluoroacetone with alkali metal or quaternary ammonium cyanides. When a 4-oxazolidone of Formula II having different substituents in the 2- and 5-positions is desired, a mixture of equal molar amounts of the ketones III and IV are employed. The use of such a mixture of ketones also results in the formation of 4-oxazolidones derived from two moles of ketone III, and from two moles of ketone IV.

In addition to the above-described method, the 4-oxazolidone starting materials of Formula II can also be prepared by the hydrolysis of the corresponding 4-amino-3-oxazolines. This alternating procedure is illustrated by the following description of the preparation of 2,2,5,5-tetrakis-(trifluoromethyl)-4-oxazolidone.

A solution of 3.0 g. of 4-amino-2,2,5,5-tetrakis-(trifluoromethyl)-3-oxazoline in 30 ml. of 90% sulfuric acid is slowly heated to 200° C. over a period of 2 hours. A white sublimate forms in the condenser. The sublimate is scraped out and dissolved in 5% sodium bicarbonate solution. The solution is filtered, and the filtrate is acidified with hydrochloric acid. The solid that precipitates is collected on a filter, washed with water, and sublimed to give 2,2,5,5-tetrakis(trifluoromethyl)-4-oxazolidone as colorless crystals, M.P. 106–107° C.

The starting materials for this alternate procedure, i.e., the 4-amino-3-oxazolines having halogenated hydrocarbon substituents in the 2- and 5-positions, can be prepared by the procedures described in my copending, coassigned application Ser. No. 618,991, filed Feb. 27, 1967.

EMBODIMENTS OF THE INVENTION

The products of this invention are illustrated in further detail by the following examples. In these examples, temperature and pressure are ambient unless otherwise noted.

EXAMPLE 1.—4-METHOXY-2,2,5,5-TETRAKIS(TRI-FLUOROMETHYL)-3-OXAZOLINE $(R=-CH_3;\ A^1=D^1=A^2=D^2=X=F)$

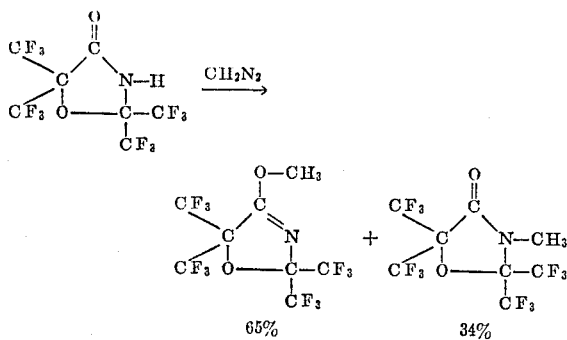

A 2.5% solution of diazomethane in diethyl ether was added portionwise to a solution of 17.95 g. (0.05 mole) of 2,2,5,5-tetrakis(trifluoromethyl)-4-oxazolidone in 25 ml. of diethyl ether at 25° C. until a faint yellow color persisted. The addition required about 10 minutes. Distillation gave a colorless oil, B.P. 128–136° C., $n_D^{25}$ 1.3111.

Analysis.—Calcd. for $C_8H_3F_{12}NO_2$: C, 25.75; H, 0.81; F, 61.11; N, 3.78. Found: C, 26.17; H, 1.08; F, 60.87; N, 3.52.

Gas chromatographic analysis indicated the product was a mixture of two components in the ratio of 65:34. The more abundant component, 4-methoxy-2,2,5,5-tetrakis(trifluoromethyl)-3-oxazoline, was separated by preparative gas chromatography. It was obtained as a colorless solid, M.P. 30° C., I.R., 5.95μ. The proton NMR spectrum showed a singlet at 419 p.p.m. (in $CDCl_3$) with a width at ½ height of 0.8 c.p.s. The $F^{19}$ NMR spectrum showed two septets centered at 382 and 625 c.p.s. higher field from Freon® 112.

Analysis.—Calcd. for $C_8H_3F_{12}NO_2$: C, 25.75; H, 0.81; F, 61.11; N, 3.78. Found: C, 25.61; H, 1.15; F, 60.49; N, 3.69.

The less abundant component was identified as 3-methyl-2,2,5,5-tetrakis(trifluoromethyl)-4-oxazolidone by comparison of its infrared spectrum and gas chromatographic retention time with those of an authentic sample.

EXAMPLE 2.—4-ETHOXY-2,2,5,5-TETRAKIS(TRI-FLUOROMETHYL)-3-OXAZOLINE $(R=-C_2H_5;\ A^1=D^1=A^2=D^2=X=F)$

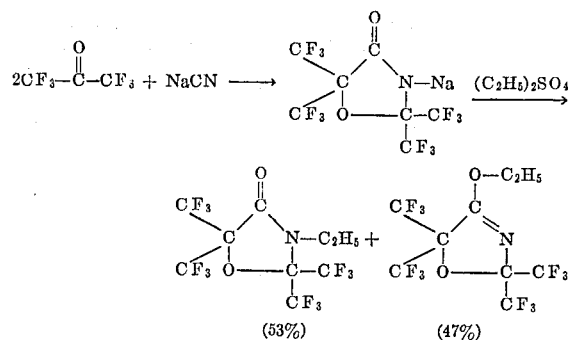

Hexafluoroacetone, 125 ml. at −78° C. (1.2 moles), was distilled over a period of 30 minutes into a stirred suspension of 30 g. (0.6 mole) of sodium cyanide in 500 ml. of acetonitrile. The reaction mixture warmed to 50° C. during the addition. The mixture was cooled to 25° C., 150 g. of diethyl sulfate was added, and the resulting mixture was stirred for 18 hours at 25° C. Water was added to dissolve the precipitated salts, and the organic layer was separated, washed with 5% sodium bicarbonate solution and then with water and dried over anhydrous magnesium sulfate. Distillation gave 147 g. (61%) of a colorless oil, B.P. 140–141° C., $n_D^{25}$ 1.3234.

Analysis.—Calcd. for $C_9H_5F_{12}O_2N$: C, 27.93; H, 1.30; F, 58.88; N, 3.62. Found: C, 28.42; H, 1.59; F, 58.71; N, 3.78.

Gas chromatographic analysis indicated the product was a mixture of two components in the ratio of 47:53. Samples of each component were separated by preparative gas chromatography for further characterization.

4-ethoxy - 2,2,5,5-tetrakis(trifluoromethyl)-3-oxazoline, the 47% component, was obtained as a colorless oil, B.P. 136° C. $n_D^{25}$ 1.3178, I.R. 5.98μ. The proton NMR spectrum showed a quartet at 4.62 p.p.m. ($J=7$ c.p.s.) of area 2 and a triplet at 1.43 p.p.m. ($J=7$ c.p.s.) of area 3. The $F^{19}$ NMR spectrum showed two septets centered at 370 and 620 c.p.s. higher field than Freon® 112.

Analysis.—Calcd. for $C_9H_5F_{12}O_2N$: C, 27.93; H, 1.30; F, 58.88; N, 3.62. Found: C, 28.03; H, 1.50; F, 58.72; N, 3.75.

3-ethyl - 2,2,5,5 - tetrakis(trifluoromethyl)-4-oxazolidone, the 53% component, was obtained as a colorless oil, B.P. 142° C., $n_D^{25}$ 1.3263, I.R. 5.65μ. The proton NMR spectrum showed a quartet at 3.72 p.p.m. ($J=7$ c.p.s.) of area 2 and a triplet at 1.35 p.p.m. ($J=7$ c.p.s.) of area 3. The $F^{19}$ NMR spectrum showed two septets centered at 405 and 550 c.p.s. higher field than Freon® 112.

Analysis.—Calcd. for $C_9H_5F_{12}O_2N$: C, 27.93; H, 1.30; F, 58.88; N, 3.62. Found: C, 28.08; H, 1.55; F, 58.78; N, 3.75.

EXAMPLE 3.—4-ETHOXY-2,2,5,5-TETRAKIS (TRIFLUOROMETHYL)-3-OXAZOLINE ($R=$—$C_2H_5$; $A^1=D^1=A^2=X=F$)

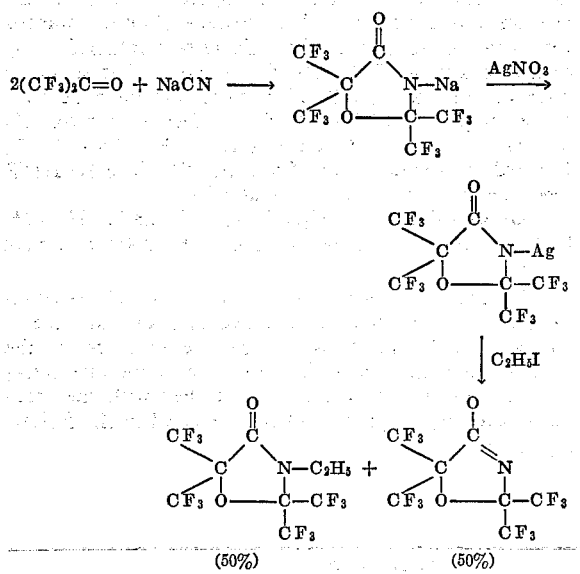

Hexafluoroacetone, 21 ml. at —78° C. (0.2 mole), was distilled into a stirred suspension of 4.9 g. (0.1 mole) of sodium cyanide in 100 ml. of acetonitrile. A solution of 17.0 g. (0.1 mole) of silver nitrate in 25 ml. of acetonitrile was then added at room temperature, and the sodium nitrate that precipitated was removed by filtration. Ethyl iodide, 15.6 g. (0.1 mole) was added to the solution of the silver salt. An exothermic reaction ensued and a precipitate formed. The reaction mixture stood for 20 hours at room temperature, and then was filtered. Distillation of the filtrate gave 25 g. of a colorless oil, B.P. 140°–141° C., $n_D^{25}$ 1.3280. Infrared, proton NMR spectrum, and gas chromatographic analysis showed this product consisted of an approximately 50:50 mixture of 4-ethoxy-2,2,5,5-tetrakis(trifluoromethyl) - 3 - oxazoline and 3-ethyl-2,2,5,5-tetrakis(trifluoromethyl)-4-oxazolidone.

EXAMPLE 4.—4-METHOXY - 2,5 - BIS(DIFLUOROMETHYL) - 2,5 - BIS(TRIFLUOROMETHYL)-3-OXAZOLINE ($R=$—$CH_3$; $A^1=A^2=F$; $D^1=D^2=H$; $X=F$)

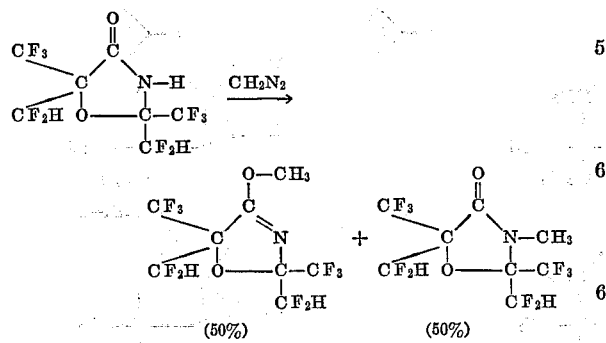

A 3% solution of diazomethane was added portionwise to 7.0 g. of powdered 2,5-bis(difluoromethyl)-2,5-bis(trifluoromethyl)-4-oxazolidone until no further reaction occurred and the reaction mixture remained yellow. Distillation gave 6.75 g. of a colorless liquid, B.P. 95–96° C. (50 mm.). Gas chromatographic analysis of this liquid indicated it was a mixture of two components in approximately equal amounts. These two components were separated by preparative gas chromatography and identified by infrared and elemental analysis as 2,5-bis (difluoromethyl) - 4 - methoxy - 2,5 - bis(trifluoromethyl)-3-oxazoline, colorless liquid, and 2,5-bis(difluoromethyl)-3-methyl - 2,5 - bis(trifluoromethyl) - 4-oxazolidone, a colorless solid, M.P. 51.5–52.5° C.

The infrared spectrum of the oxazoline showed a band at 5.98μ for C=N.

Analysis.—Calcd. for $C_8H_5F_{10}NO_2$: C, 28.50; H, 1.50; F, 56.32; N, 4.16. Found: C, 28.71; H, 1.81; F, 56.33; N, 4.31.

The infrared spectrum of the oxazolidone showed a band at 5.64μ for C=O.

Analysis.—Calcd. for $C_8H_5F_{10}NO_2$: C, 28.50; H, 1.50; F, 56.32; N, 4.16. Found: C, 28.81; H, 1.73; F, 56.21; N, 4.23.

The 2,5-bis(difluoromethyl) - 2,5 - bis(trifluoromethyl)-4-oxazolidone used as starting material in the preceding example was prepared as follows: Pentafluoroacetone, 42 g. (25 ml. at —78° C., 0.28 mole) was slowly distilled over a period of 30 minutes into a stirred suspension of 6.72 g. (0.14 mole) of powdered sodium cyanide in 100 ml. of acetonitrile. The mixture was stirred at 25° C. for 1 hour and then mixed with 200 ml. of water containing 50 ml. of 10% hydrochloric acid. The organic layer that formed was washed with water, then mixed with 25 ml. of concentrated sulfuric acid and poured over ice. The solid that formed was dissolved in 50 ml. of 5% sodium hydroxide solution. The resulting solution was filtered, and the filtrate was acidified with 10% hydrochloric acid. The solid that precipitated was collected on a filter, washed with water, and then recrystallized from benzene. There was obtained 10.7 g. of the oxazolidone as colorless needles, M.P. 91–93° C. The infrared spectrum showed a band at 5.62μ for C=O.

Analysis.—Calcd. for $C_7H_3F_{10}NO_2$: C, 26.01; H, 0.94; F, 58.81; N, 4.34. Found: C, 26.30; H, 1.08; F, 59.01; N, 4.53.

EXAMPLE 5.—1,1,2,2,3,3,7,7,8,8,9,9 - DODECAFLUORO - 11 - METHOXY-5-OXA - 10 - AZADISPIRO [3.1.3.2]UNDEC-10-ENE ($R=$—$CH_3$; $A^1$ and $D^1=$—$CF_2$—; $A^2$ and $D^2=$—$CF_2$—; $X=F$)

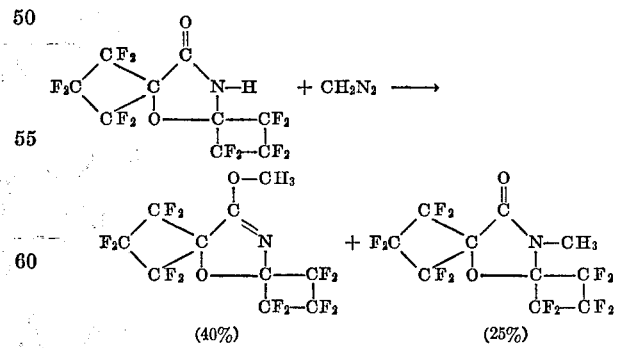

Four grams (0.0104 mole) of 1,1,2,2,3,3,7,7,8,8,9,9-dodecafluoro - 5 - oxa-10-azadispiro[3.1.3.2]undecane-11-one in 50 ml. of diethyl ether was cooled in an ice bath and a diethyl ether solution of diazomethane (ca. 0.0002 mole/ml.) added. About 50 ml. of solution was required to obtain a yellow color which persisted. Diethyl ether was removed by evaporation and the residual oil was separated by gas chromatography into 1.6 g. (40%) of 1,1,2,2,3,3,7,7,8,8,9,9-dodecafluoro - 11 - methoxy-5-oxa- 10-azadispiro[3.1.3.2]undec-10-ene (compound A), $n_D^{25}$ 1.3413, and 1.0 g. (25%) of 1,1,2,2,3,3,7,7,8,8,9,9-dodecafluoro-10-methyl-5-oxa - 10 - azadispiro[3.1.3.2]undecane-11-one (compound B), $n_D^{25}$ 1.3553. Compound A and compound B are both colorless liquids.

Infrared absorption of compound A was at 6.0μ (C=N) and of compound B was at 5.64μ (C=O). The H¹ NMR spectrum of compound A showed a single peak at τ6.13 and that of compound B showed a single peak at τ6.98.

*Analysis.*—Calcd. for $C_{10}H_3F_{12}NO_2$: C, 30.25; H, 0.77; F, 57.43; N, 3.52. Found A: C, 30.63; H, 1.32; F, 57.08; N, 3.53. Found B: C, 30.61; H, 0.74; F, 57.62; N, 3.26.

The 1,1,2,2,3,3,7,7,8,8,9,9-dodecafluoro - 5 - oxa-10-azadispiro[3.1.3.2]undecane-11-one used as starting material in the preceding example was prepared as follows: A mixture of 40 g. of hexafluorocyclobutanone, 3 g. of hydrogen cyanide and a few crystals of potassium cyanide was sealed in a Carius tube at liquid nitrogen temperature. On thawing and shaking, an exothermic reaction occurred. The tube was cooled and opened, and the contents were distilled to give 9.8 g. (21%) of the cyanhydrin and 28 g. of a colorless oil, B.P. 76° C. (14 mm.), $n_D^{25}$ 1.3413. A solution of 22.3 g. of this oil dissolved in 5 ml. of glyme (the dimethyl ether of ethylene glycol) was added slowly to 4 g. of 52% sodium hydride (in mineral oil). The mixture was cooled and added slowly to ice. After acidification with hydrochloric acid, the mixture was extracted with methylene chloride, washed with water, dried, and distilled. There was obtained 8.6 g. of a colorless oil, B.P. 110° C. (3 mm.), that solidified upon cooling. Recrystallization from nitromethane gave 4.1 g. of 1,1,2,2,3,3,7,7,8,8,9,9 - dodecafluoro-5-oxa-10-azadispiro[3.1.3.2]undecane-11-one, M.P. 118-119° C. Infrared absorption was at 5.62μ (C=O). The H¹ NMR spectrum showed a broad peak at 5.70μ.

*Analysis.*—Calcd. for $C_9HF_{12}NO_2$: C, 28.22; H, 0.26; F, 59.53; N, 3.66. Found: C, 28.40; H, 0.49; F, 59.20; N, 3.63.

Additional examples of 4-alkoxy- or 4-cycloalkoxy-3-oxazolines having halogenated hydrocarbon substituents on the 2- and 5-positions that can be prepared by the methods illustrated in the examples or by the alternative method described hereinbefore, together with the reactants necessary to prepare them, are listed in the following table:

TABLE

| 4-Oxazolidone Reactant | Alkylating (or Cycloalkylating) Agent | 4-Alkoxy (or 4-Cycloalkoxy)-3-oxazolines |
|---|---|---|
| [ring: $CF_3$, $CF_3$ on C; NK; O—C($CF_3$)—; C=O] | $Cl(CH_2)_9CH_3$ | [ring with O—$(CH_2)_9CH_3$ substituent; C=N] |
| [ring: $CF_3$, $CF_2Cl$ on C; NH; O—C($CF_3$)—; C=O] | $(CH_3)_2CN_2$ | [ring with O—$CH(CH_3)_2$ substituent; C=N] |
| [ring: $CF_3$, $CF_3$ on C; NNa; O—C($CF_2H$)—; C=O] | Br—⟨S⟩ (6-membered) | [ring with O—⟨S⟩ substituent; C=N] |
| [ring: $HCF_2$, $HCF_2$ on C; NNa; O—C($CF_2H$)—; C=O] | Br—⟨S⟩ (4-membered) | [ring with O—⟨S⟩ substituent; C=N] |
| [ring: $ClCF_2$, $ClCF_2$ on C; NNa; O—C($CF_3$)—; C=O] | n-$C_4H_9Br$ | [ring with O—$C_4H_9$-n substituent; C=N] |
| [ring: $BrCF_2$, $CF_3$ on C; NK; O—C($CF_2$)—$CF_3$; C=O] | n-$C_8H_{17}Br$ | [ring with O—$C_8H_{17}$-n substituent; C=N; $BrCF_2$, $CF_3$; $CF_2Br$, $CF_3$] |

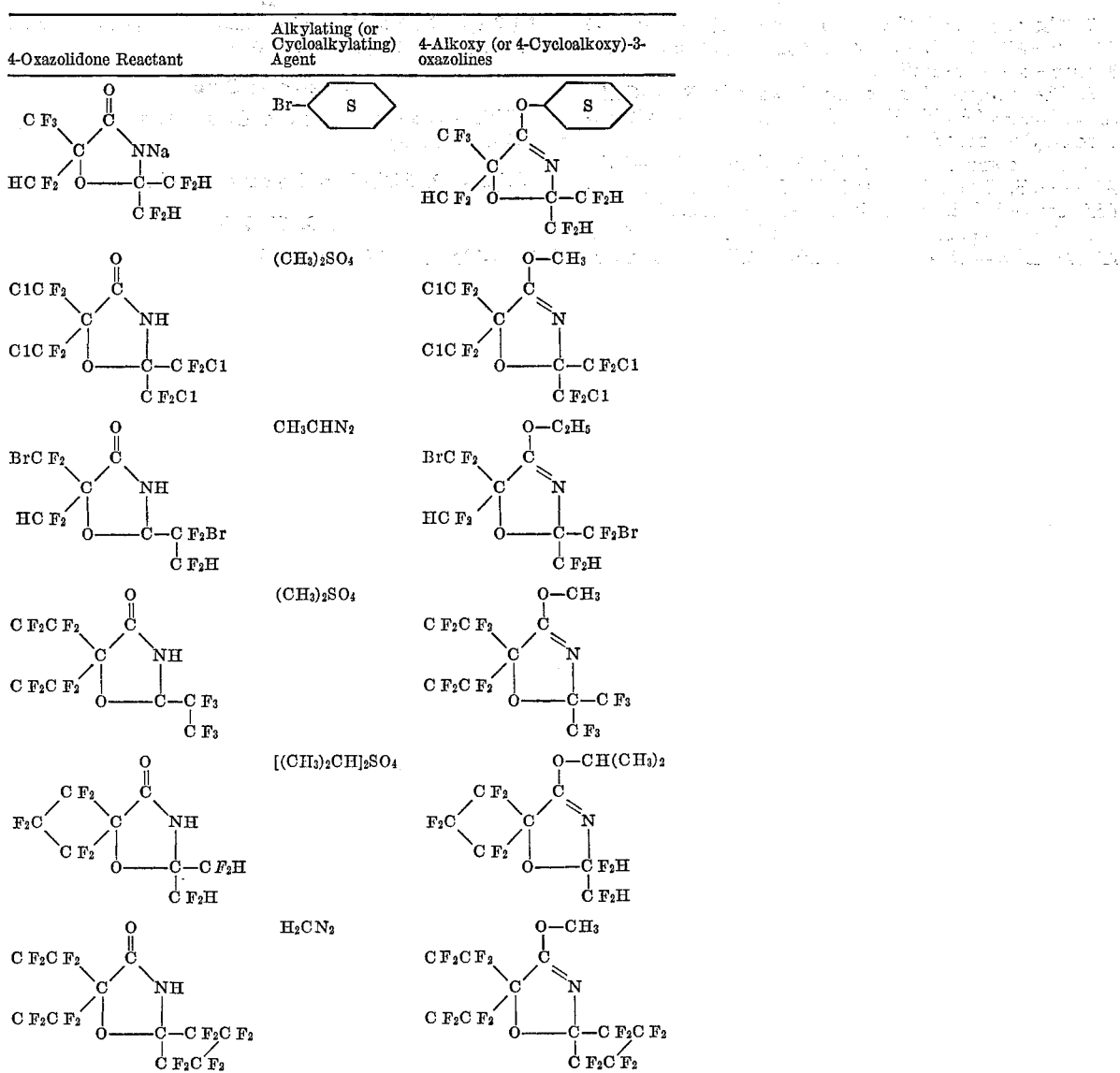

The 4-alkoxy- and 4-cycloalkoxy-3-oxazolines of this invention are liquids or low-melting solids and are useful solvents for polymers containing a high percentage of fluorine. Solutions of such polymers prepared with the solvents of this invention can be used to coat paper or fabrics to render them oil- and water-repellent as illustrated by the following example.

EXAMPLE A

A 5% solution of low-melting tetrafluoroethylene polymer (M.P. 83–145 C°.) was prepared in 4-ethoxy-2,2,5,5-tetrakis(trifluoromethyl)-3-oxazoline. A sheet of filter paper was coated with this solution and the coated paper was dried. The paper treated in this manner was oil- and water-repellent. The uncoated paper was easily saturated with oil and water.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

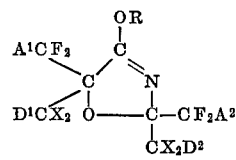

wherein:

R is alkyl or cycloalkyl of up to 10 carbons;
$A^1$ and $A^2$, alike or different, are hydrogen, fluorine, chlorine or bromine, or, in combination with $D^1$ and $D^2$, respectively, are perfluoroalkylene of 1–2 carbon atoms;
$D^1$ and $D^2$, alike or different, are hydrogen, fluorine, chlorine or bromine, or, in combination with $A^1$ and $A^2$, respectively, are perfluoroalkylene of 1–2 carbon atoms; and
the X's, alike or different, are fluorine, chlorine or bromine, not more than one bromine being attached to the same carbon.

2. The compound of claim 1 wherein R=—$CH_3$ and $A^1=D^1=A^2=D^2=X=F$, 4-methoxy-2,2,5,5-tetrakis(trifluoromethyl)-3-oxazoline.

3. The compound of claim 1 wherein R=—$C_2H_5$, $A^1=D^1=A^2=D^2=X=F$, 4-ethoxy-2,2,5,5-tetrakis(trifluoromethyl)-3-oxazoline.

4. The compound of claim 1 wherein R=—$CH_3$, $A^1=A^2=F$, $D^1=D^2=H$ and X=F, 4-methoxy-2,5-bis-(difluoromethyl)2,5-bis(trifluoromethyl)-3-oxazoline.

5. The compound of claim 1 wherein R=—$CH_3$, $A^1$ and $D^1$=—$CF_2$—, $A^2$ and $D^2$=—$CF_2$— and X=F, 1,1,2,2,3,3,7,7,8,8,9,9 - dodecafluoro - 11 - methoxy-5-oxa-10-azadispiro[3.1.3.2]undec-10-ene.

References Cited

Eichenberger et al.: Helv. Chim. Acta, vol. 38, pp. 284–295 (1955).

ALTON D. ROLLINS, Primary Examiner

U.S. Cl. X.R.

117—135, 155; 260—30, 299